US012440945B2

(12) United States Patent
Hershkovich

(10) Patent No.: US 12,440,945 B2
(45) Date of Patent: Oct. 14, 2025

(54) QUICK ACTION CLAMPING APPARATUS

(71) Applicant: Zvi Hershkovich, Karmiel (IL)

(72) Inventor: Zvi Hershkovich, Karmiel (IL)

( * ) Notice: Subject to any disclaimer, the term of this patent is extended or adjusted under 35 U.S.C. 154(b) by 529 days.

(21) Appl. No.: 17/913,299

(22) PCT Filed: Apr. 2, 2020

(86) PCT No.: PCT/IB2020/053162
§ 371 (c)(1),
(2) Date: Sep. 21, 2022

(87) PCT Pub. No.: WO2021/198735
PCT Pub. Date: Oct. 7, 2021

(65) Prior Publication Data
US 2023/0136041 A1 May 4, 2023

(51) Int. Cl.
*B25B 5/02* (2006.01)
*B25B 5/08* (2006.01)

(52) U.S. Cl.
CPC ................ *B25B 5/02* (2013.01); *B25B 5/085* (2013.01)

(58) Field of Classification Search
CPC .. B25B 1/02; B25B 1/08; B25B 11/00; B25B 5/02; B25B 5/085
See application file for complete search history.

(56) References Cited

U.S. PATENT DOCUMENTS 4,241,906 A * 12/1980 Cole .......................... B25B 1/02 269/167
5,222,420 A 6/1993 Sorensen et al.
5,348,276 A * 9/1994 Blacker .................... B25B 5/085 269/169
7,040,609 B1 * 5/2006 Liou ........................ B25B 5/068 269/6
9,067,306 B1 * 6/2015 Lee ............................ B25B 1/02
9,815,177 B2 † 11/2017 Ursell
10,556,326 B1 * 2/2020 Kelly ......................... B25B 5/02
(Continued)

FOREIGN PATENT DOCUMENTS

CN 201158008 Y 12/2008
DE 19858897 A1 6/2000

*Primary Examiner* — Seahee Hong
(74) *Attorney, Agent, or Firm* — William H. Dippert; Laurence A. Greenberg; Werner H. Stemer

(57) ABSTRACT

A dual-cam device is described configured to be engaged with a rail and a stopper for clamping at least one object. The dual cam device comprises a jaw; a body; a member connecting the jaw and the body wherein the member has a member-base configured to associate with and slide on the rail; and a lever pivotally connected to the member, wherein the lever has a first cam and a second cam and wherein the lever is configured to be tilted from an open position to a clamp position and vice versa. During tilting the lever from an open position to a clamp position in which the object is clamped, the first cam causes the dual cam device to secure emplacement position of the dual cam device to the rail and then the second cam causes the dual cam device to press and clamp the object by the jaw against the stopper. It is further described a clamping apparatus that comprises at least one dual cam device; at least one rail having a channel; and at least one stopper.

14 Claims, 6 Drawing Sheets

(56) References Cited

U.S. PATENT DOCUMENTS

| | | | | |
|---|---|---|---|---|
| 2009/0206534 | A1* | 8/2009 | McCracken | B25B 5/085 269/6 |
| 2013/0134642 | A1 | 5/2013 | Chen | |
| 2015/0174737 | A1* | 6/2015 | Chen | B25B 5/085 269/216 |

* cited by examiner
† cited by third party

QUICK ACTION CLAMPING APPARATUS

CROSS-REFERENCE TO RELATED PATENT APPLICATION

This patent application is a U.S. National Phase filing under 35 U.S.C. § 371 of co-pending PCT Patent Application No. PCT/IB2020/053162, filed Apr. 2, 2020, incorporated herein by reference in its entirety.

TECHNICAL FIELD

The present disclosed subject matter relates to clamping tools. More particularly, the present disclosed subject matter relates to a quick action clamping apparatus.

BACKGROUND

Vices and clamping tools are known for securing or fixing objects into the desired position. These tools are often used for temporary positioning components while fixing them together. In addition, vices and clamping tools are intended for permanent use during construction, machining woodwork, or the like.

In essence, clamps or vices are fastening devices used to hold or secure objects tightly together to prevent movement or separation by applying pressure. Commercially available, vices and clamping tools generally use a threaded screw to determine the position of the objects (work-piece) and generate clamping pressure on it.

Clamping tools have different shapes and mechanisms, such as F-clamps, C-clamps and G-clamps, which are used to position the object and determine a clamping pressure upon it by tightening a threaded screw. Other clamps generate clamping pressure by friction.

BRIEF SUMMARY

According to a one aspect of the present disclosed subject matter a clamping apparatus for clamping at least one object, the clamping apparatus comprising: at least one rail having a channel; at least one stopper; and at least one dual-cam device comprising: a jaw and a body connected by a member having a member-base; a lever configured to be tilted comprising: two bushings, wherein each bushing comprising a first cam and a second cam; and wherein the lever and member are pivotally connected; and wherein the member-base slides within the channel thereby allowing the device to slide along the rail, wherein during tilting the lever, the first cam causes the device to secure emplacement to the rail then the second cam causes the device to clamp the object, so that the object is pressed by the jaw against the stopper.

In some exemplary embodiments, the bushing is an eccentric bushing that rotates around a pivot when the lever is tilted, and wherein the first cam causes the device to secure emplacement by applying pressure with the first cam against the body that pull the member upwards so that the member-base is locked against the rail, and wherein the second cam causes the device to clamp the object by applying pressure with the second cam against a rear-end of the jaw thereby pushing the object against the stopper.

In some exemplary embodiments, the clamping apparatus further comprise an L-shape clamping base constructed of two perpendicular rails each having metric marking and imperial marking, and wherein each rail is configured to accommodate at least one device.

In some exemplary embodiments, the clamping apparatus further comprise a corner clamping base comprising two stoppers mounted perpendicular to one another and a channel configured to accommodate at least one device, wherein the device further comprises a jaw-extension having a right-angled triangle shape, and wherein a hypotenuse side of the j aw-extension is permanently connected to the jaw.

In some exemplary embodiments, the clamping apparatus further comprise a mitered slotted base comprising: a plurality of stoppers; a plurality of channels configured to accommodate two or more devices.

In some exemplary embodiments, the clamping apparatus is used as vise tools.

In some exemplary embodiments, the stopper is selected from the group consisting of a fixed-jaw integrated with the rail or the base; a fixed-jaw connected to the rail or the base; a device; and any combination thereof.

In some exemplary embodiments, the device further comprises regulator configured to adjust the pressure against the rear-end of the jaw.

According to another aspect of the present disclosed subject matter a dual-cam device configured to be engaged with a rail and a stopper, for clamping at least one object the device comprising: a jaw and a body connected by a member having a member-base; a lever configured to be tilted comprising: two bushings, wherein each bushing comprising a first cam and a second cam; and wherein the lever and member are pivotally connected; and wherein the member-base slides within the channel thereby allowing the device to slide along the rail, wherein during tilting the lever, the first cam causes the device to secure emplacement to the rail then the second cam causes the device to clamp the object, so that the object is pressed by the jaw against the stopper.

In some exemplary embodiments, the bushing is an eccentric bushing that rotates around a pivot when the lever is tilted, and wherein the first cam causes the device to secure emplacement by applying pressure with the first cam against the body that pull the member upwards so that the member-base is locked against the rail, and wherein the second cam causes the device to clamp the object by applying pressure with the second cam against a rear-end of the jaw thereby pushing the object against the stopper.

In some exemplary embodiments, the device further comprises regulator configured to adjust the pressure against the rear-end of the jaw.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, regarding the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1:
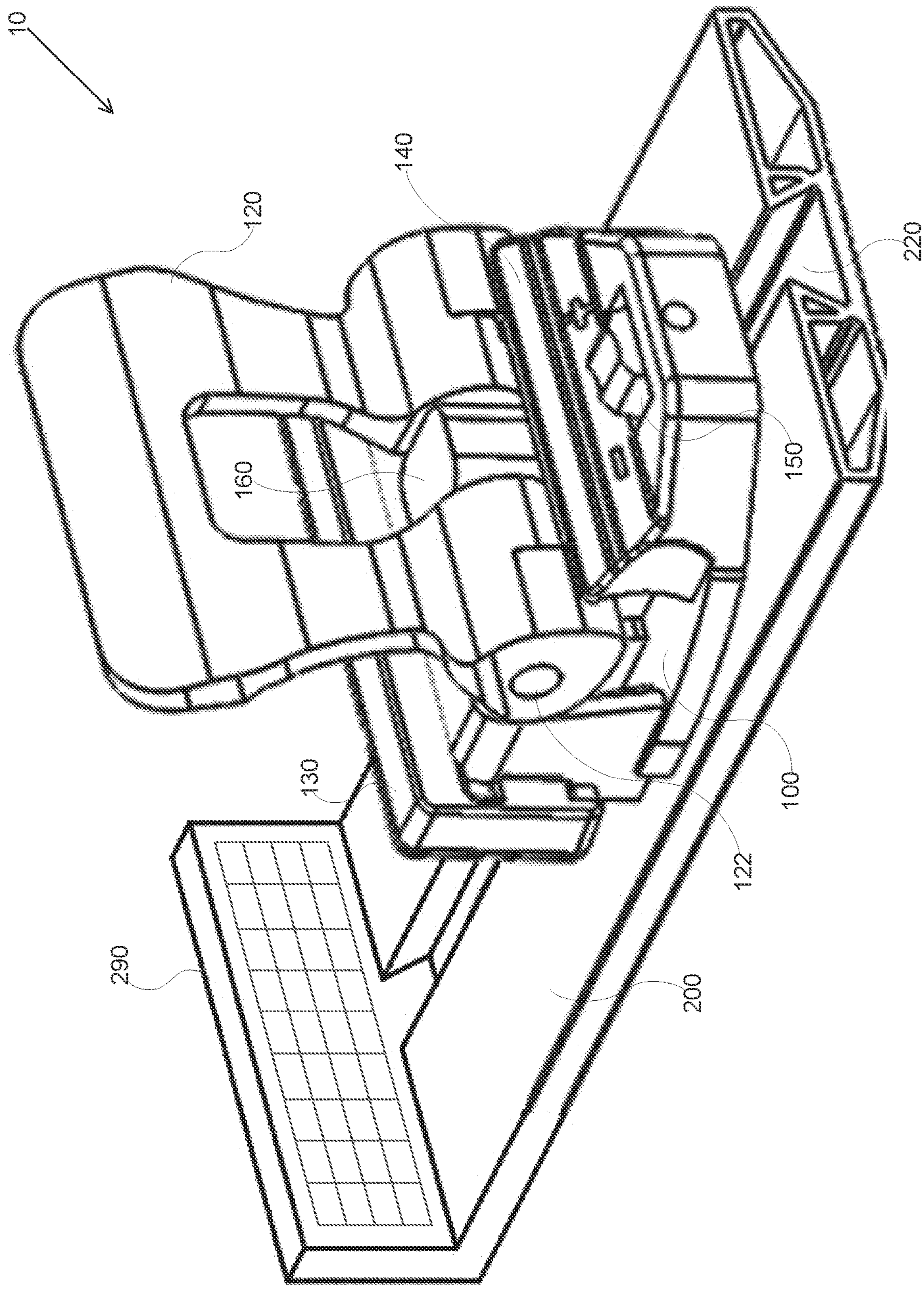
FIG. 1 shows a perspective view of a clamping apparatus, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components outlined in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments unless the embodiment is inoperative without those elements.

One objective of the present disclosure is to provide a dual-cam device, configured for emplacing and clamping an object by a single stroke of a lever. In some exemplary embodiments, the emplacement is performed by locking the device in a position, along a rail, while in contact with the object (work-piece) and while the object's opposite end is pressed against a stopper. In some exemplary embodiments, the clamping action is further comprising pressing the object, by the device, against the stopper.

Another objective of the present disclosure is to provide a quick-action clamping apparatus capable of both emplacing and clamping an object by a single action of force applied by a user of the present disclosure. In some exemplary embodiments, the quick-action clamping apparatus can be comprised of the dual-cam device capable of sliding along a rail of a clamping base that is typically fastened to a bench.

The clamping apparatus, of the present disclosure, can be provided with a straight clamping base, an L-shape clamping base, an angled clamping base, a mitered clamping base, and any combination thereof, or the like. All the bases have at least one rail for accommodating at least one dual-cam device.

A dual-cam device is provided in accordance with subject matter of this disclosure wherein the device is configured to be engaged with a rail and a stopper for clamping at least one object, the device comprising: a jaw; a body; a member connecting the jaw and the body wherein the member has a member-base configured to associate with and slide on the rail; and a lever pivotally connected to said member, wherein the lever has a first cam and a second cam and wherein the lever is configured to be tilted from an open position to a clamp position and vice versa, wherein during tilting the lever from an open position in which the dual cam device slides along the rail to a clamp position in which the object is clamped, the first cam causes the dual cam device to secure emplacement position of the dual cam device to the rail and then the second cam causes the dual cam device to press and clamp the object by the jaw against the stopper.

The first cam and the second cam of the dual-cam device form an eccentric bushing that rotates around a pivot when the lever is tilted, and wherein said first cam causes the dual cam device to secure emplacement by applying pressure that pulls the member upwardly so that the member-base is locked against the rail, and wherein said second cam causes the dual cam device to clamp the object by applying pressure against a rear-end of the jaw thereby pushing the object against the stopper.

Figure 2A:
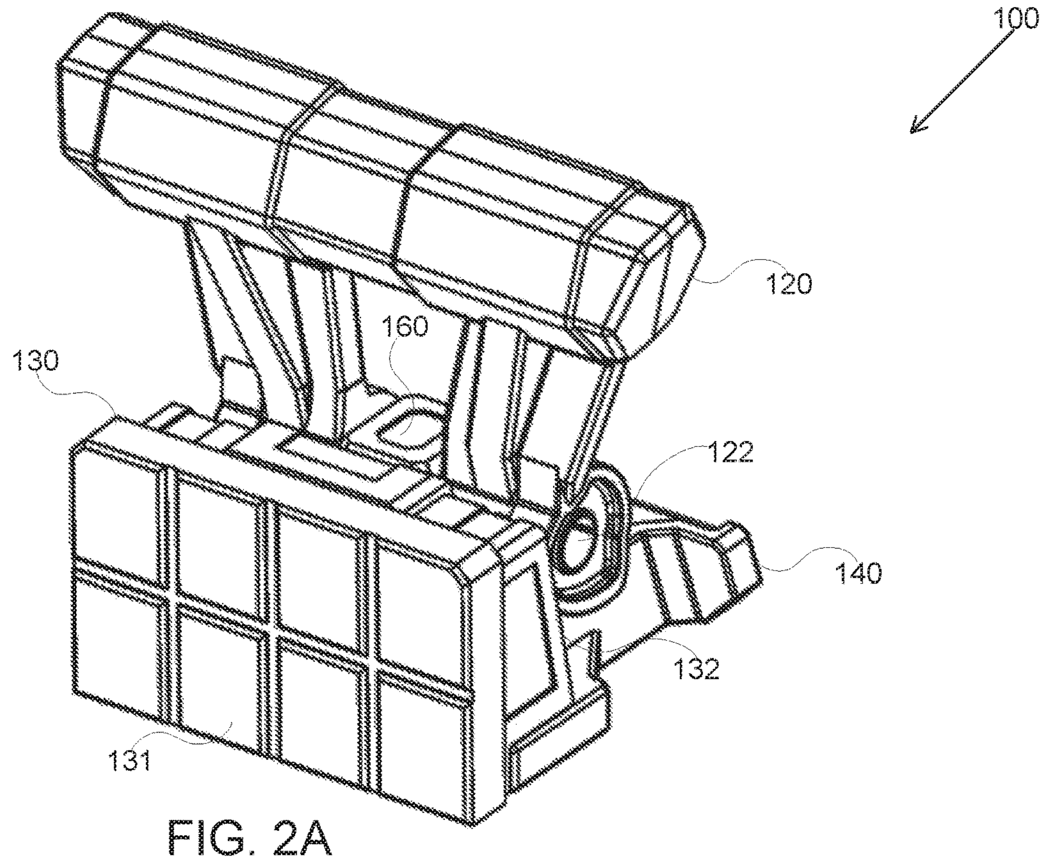
FIG. 2A shows a perspective view of a dual-cam device, in accordance with some exemplary embodiments of the disclosed subject.

Referring now to FIG. 2A showing a perspective view of a dual-cam device, in accordance with some exemplary embodiments of the disclosed subject.

In some exemplary embodiments of the disclosed subject matter, the dual-cam device (device) 100 is comprised of a lever 120 pivotally connected to member 160, preferably by pivot 122, wherein member 160 is inserted through body 140 and jaw 130 thereby connecting body 140 and jaw 130 in a way that allows jaw 130 to slightly slide with respect to body 140. In some exemplary embodiments, the jaw 130 has a rear end 132 and front end 131, which is designed to be in contact with an object (not shown in this figure).

Figure 2B:
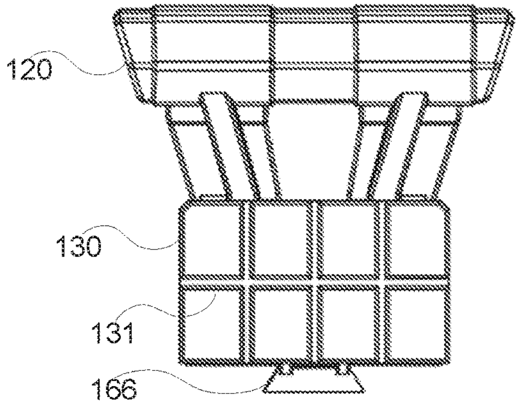
FIG. 2B shows a front view of the dual-cam device, in accordance with some exemplary embodiments of the disclosed subject.

Referring now to FIG. 2B showing a front view of the dual-cam device, in accordance with some exemplary embodiments of the disclosed subject. The front-view of the dual-cam device depicts a member's base 166, which is an integral part of member 160 (cannot be seen in this figure). It should be noted that member 160 and its base 166 are configured to slightly move, in a direction that overlaps an axis of the member with respect to body 140 and jaw 130. In some exemplary embodiments, base 166 can have a trapezoid shape, cone shape, rectangular shape and any combination thereof, or the like. In any case, the base 166 has dimensions that don't allow the base to exit through a passage in a channel of the rail in which the member is engaged.

Figure 2C:
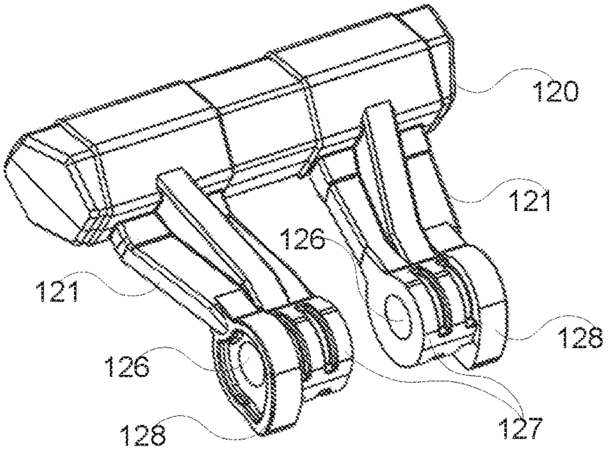
FIG. 2C shows a perspective view of a lever of the dual-cam device, in accordance with some exemplary embodiments of the disclosed subject

Referring now to FIG. 2C showing a perspective view of the lever of the dual-cam device, in accordance with some exemplary embodiments of the disclosed subject matter. In some exemplary embodiments, lever 120 comprising two arms 121 each of which is terminated with a bushing having a first cam 127 and a second cam 128. It should be noted that a space formed between both cams that face each other, is designed to accommodate member 160 to be connected to the bushing by pivot 122 through holes 126 and a hole situated on top of member 160 (not shown). In some exemplary embodiments, the bushing can be an accenting bushing integrating two different cams, i.e. the first cam 127 and the second cam 128.

In some exemplary embodiments of the disclosed subject matter, device 100 and its subcomponents can be made of a rigid material, such as plastic, aluminum, steel and any combination thereof, or the like. It should be noted that the drawings (figures) are generally not to scale and the device 100 can be provided/manufactured to any size required for utilizing the present disclosure.

Referring now to FIG. 1 showing a perspective view of a clamping apparatus, in accordance with some exemplary embodiments of the disclosed subject matter. The clamping apparatus 10 is comprised of the dual-cam device 100, a clamping rail 200 and a stopper 290.

In some exemplary embodiments, the clamping rail 200 is a strip of a rigid material having a fixed cross-sectional profile that forms a channel 220 stretching along the base. In some exemplary embodiments, the rail 200 can be manufactured by extrusion or machining, a combination thereof, or the like, from a material, such as plastic, steel, aluminum, stainless steel, and any combination thereof, or the like.

In some exemplary embodiments, the channel 220 is designed to accommodate and engage with the base 166 of member 160, so as to allow device 100 to freely slide along channel 220. The stopper 290 functions as a barrier that stops an object (not shown in this figure) from moving while the object is being clamped by device 100. In some exemplary embodiments, the stopper 290 can be a fixed-jaw that is an integral part of rail 200 as shown in FIG. 1, or connected to one end of the base and another device 100, while an opposite end of rail 200 may be used for inserting the device 100 to the rail, i.e. inserting base 166 into the channel. Additionally or alternatively, the device 100 may be used to replace the stopper 200.

In some exemplary embodiments, the device 100 further comprises a regulator 150, implemented by a pressure control dial, as depicted in FIG. 1, a tightening screw, a combination thereof, or the like. The regulator 150 is configured to adjust the pressure applied by the device on the object.

Figure 3A:
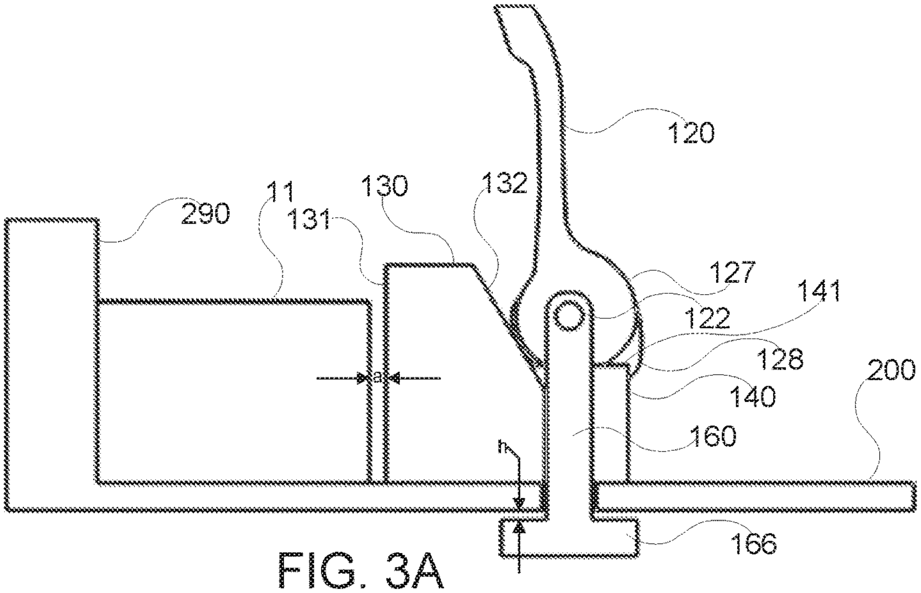
FIG. 3A shows a cross-sectional side view of the clamping apparatus, having the dual-cam device in an open position, in accordance with some exemplary embodiments of the disclosed subject.
Figure 3B:
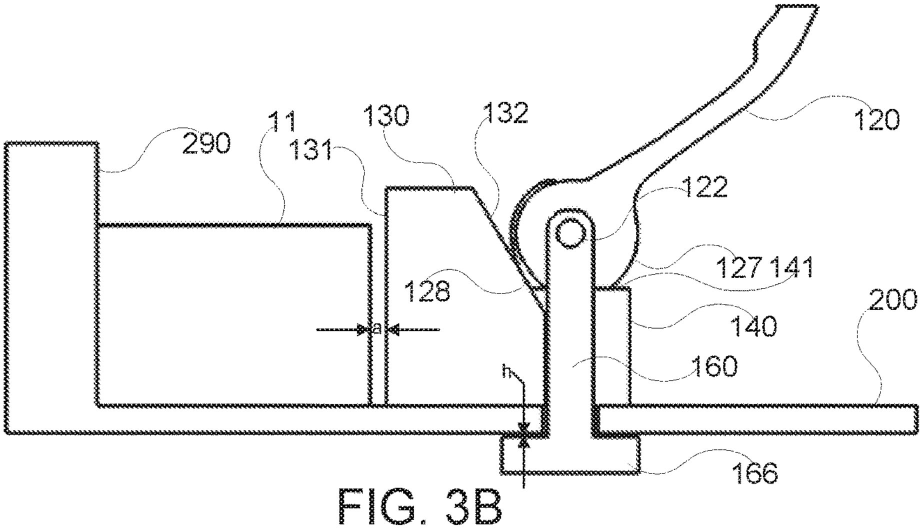
FIG. 3B shows a cross-sectional side view of the clamping apparatus, having the dual-cam device in an emplacement position, in accordance with some exemplary embodiments of the disclosed subject.
Figure 3C:
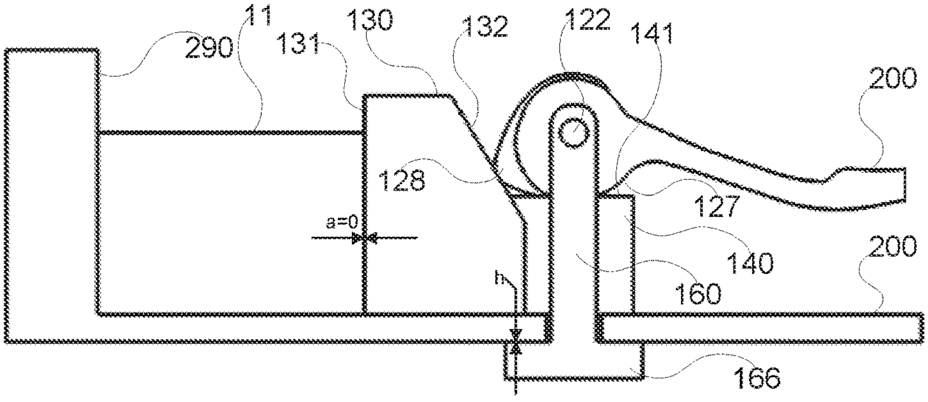
FIG. 3C shows a cross-sectional side view of the clamping apparatus, having the dual-cam device in a clamp position, in accordance with some exemplary embodiments of the disclosed subject.

Referring now to FIGS. 3A, 3B and 3C showing a cross-sectional side view of the clamping apparatus, having the dual-cam device in an open, emplacement and clamp positions respectively, in accordance with some exemplary embodiments of the disclosed subject matter.

All three figures are depicting an object 11 situated between stopper 290 and front-end 131 of jaw 130. FIG. 3A depicts the lever in an upright position, which is associated with the open position. FIG. 3B depicts the lever in a midway position, which is associated with the emplacement position. FIG. 3C depicts the lever in a full-travel position, which is associated with the clamp position.

It will be appreciated that lever 120 is configured to be tilted from the open position, via the emplacement position, to the clamp position by a single stroke applied by the user and without stopping at the emplacement position. It will be emphasized that the description comprises three drawings for the sole purpose of explaining what processes take place during the single stroke.

In some exemplary embodiments, of the open position as depicted in FIG. 3A, one end of object 11 is in contact with stopper 290 and the device 100 was moved (slid) against an opposite end of the object 11 while there is a minor distance [a] left between front-end 131 and object 11, i.e. [a]>0, and therefore no clamping pressure is applied to the object. It should be noted that in this position: lever 120 is free to rotate around member 160 and pivot 122; cam 127 is in contact with body edge 141, of body 140; cam 128 doesn't touch rear-end 132 of jaw 130 (portions of cam 128 is seen behind cam 127); and base 166 is not in contact with rail 200 while there is a slight distance h between the lower edge of the rail 200 and the base member 166, i.e. [h]>0. Thus the device is free to move towards and away from object 11 along rail 200.

In some exemplary embodiments, the emplacement position as depicted in FIG. 3B, is that one end of object 11 is in contact with stopper 290 and the device 100 was moved (in a sliding movement) against an opposite end of the object 11 while there is a minor distance [a] left between front-end 131 and object 11 and therefore, no clamping pressure is applied onto the object. It should be noted that in this position, lever 120 is in midway position (approximately 15-45 degrees) resulting from its rotation around member 160 and pivot 122 during the single stroke. Following this rotation movement, cam 127 presses body 140 causing member 160 to pull up and press base 166 against rail 200, i.e. [h]=0, while cam 128 still doesn't touches rear-end 132. Therefore, the contact between base 166 and rail 200 generates a substantial friction force between the device 100 and rail 200.

In some exemplary embodiments, in the clamp position as depicted in FIG. 3C, the lever 120 is rotated around member 160 and pivot 120 to full travel position; causing cam 128 to contact rear-end 132 and as a consequence, push jaw 130 towards the object, i.e. [a]=0. The portion of the profile of cam 128 that can be seen protruding towards the jaw behind cam 127 is the portion that now pushes the jaw. Thereby the jaw is generating a compressing force against object 11 while maintaining the position of the device on rail 200. At the same time, cam 127 maintains its pressure against body 140, which upholds the friction force between base 166 to rail 200. It should be noted that due to the profile of cam 127, the rotation from the emplacement position to the clamp doesn't pull member 160 further upwardly.

It should be noted that the advantage of using two cams is that each cam has a specific action of applying force in a different direction, although a single stroke is made in order to perform the two actions.

Figure 4A:
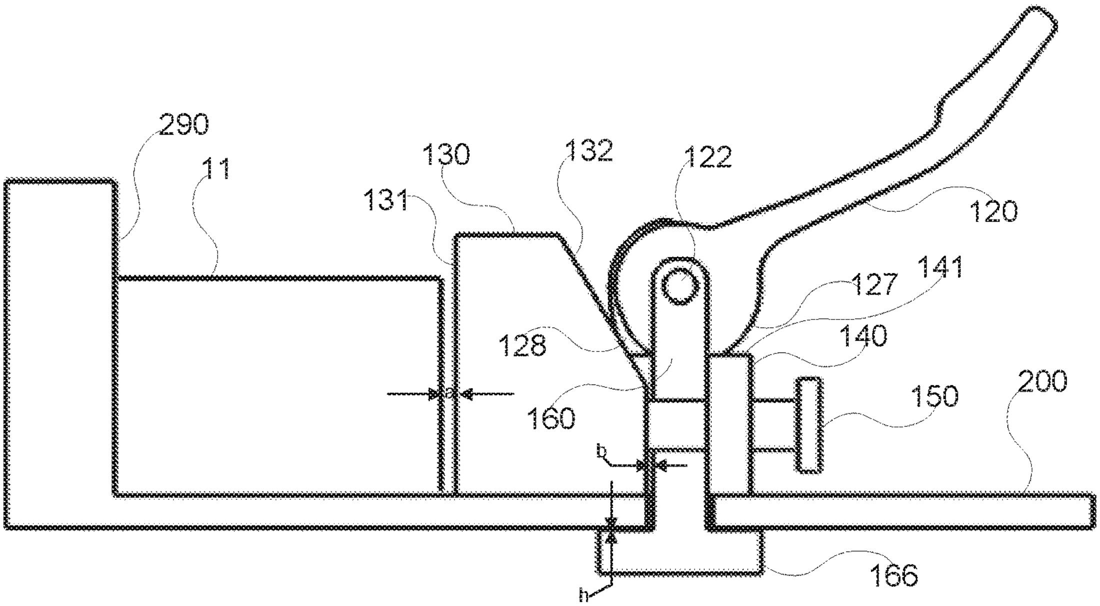
FIG. 4A shows a cross-sectional side view of clamping apparatus, having another dual-cam device that incorporates a regulator in a first position, in accordance with some exemplary embodiments of the disclosed subject.

Referring now to FIG. 4A showing a cross-sectional side view of the clamping apparatus, having another dual-cam device that incorporates a regulator in a first position, in accordance with some exemplary embodiments of the disclosed subject.

It should be noted that the this embodiment may be identical to the dual-cam device 100; but incorporates also a regulator 150. In some exemplary embodiments, the clamping apparatus of FIG. 4A is in the emplacement position. In the emplacement position shown in FIG. 4A, one end of object 11 is in contact with stopper 290 and the device 100 was moved (slide) against an opposite end of the object 11 while there is a minor distance [a] left between front-end 131 and object 11 and no clamping pressure is applied onto the object. The object has a slight movement capability between the stopper 290 and the front end 131. It should be noted that in this position, lever 120 is in midway position (approximately 15-45 degrees) resulting from its rotation around member 160 and pivot 122 during the single stroke. Following the rotation of the lever 120, cam 127 presses body 140, causing member 160 to pull up and press base 166 against rail 200, i.e. [h]=0, while cam 128 doesn't touch rear-end 132. Therefore, the contact between base 166 and rail 200 generates a substantial friction force between the device 100 and rail 200. In some exemplary embodiments, when regulator 150 is in the first position (idle), the position of jaw 130 with respect to body 140 is not affected by the regulator and a distance b defined between the body 140 and the jaw 130 is substantially zero, i.e. [b]=0.

Figure 4B:
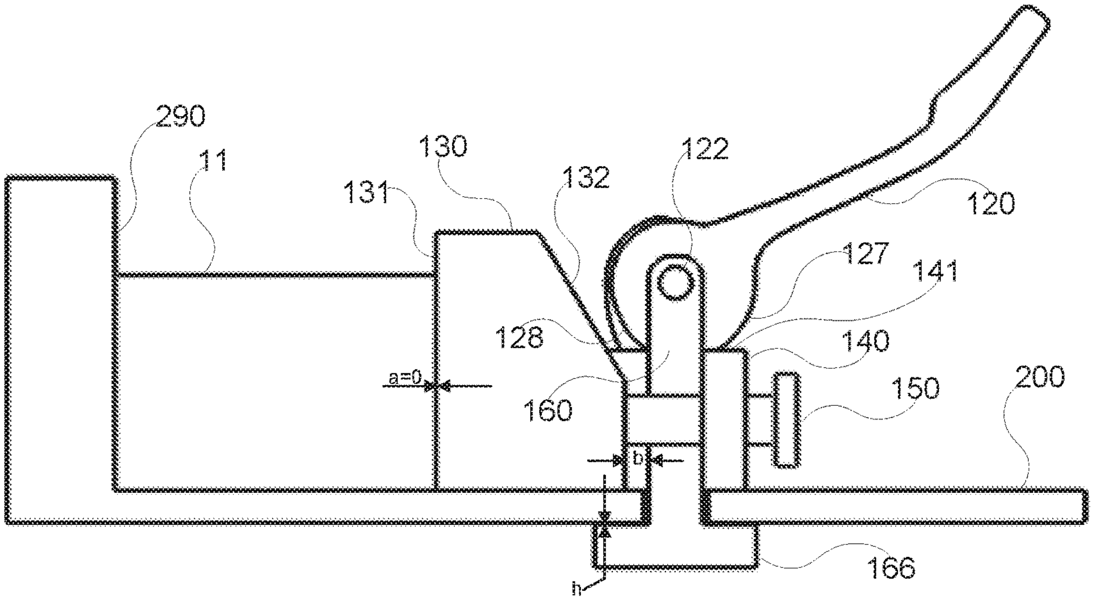
FIG. 4B shows a cross-sectional side view of the clamping apparatus, having the another dual-cam device that incorporates a regulator in a second position, in accordance with some exemplary embodiments of the disclosed subject.

Referring now to FIG. 4B showing a cross-sectional side view of the clamping apparatus, having the other dual-cam device that incorporates the regulator in a second position, in accordance with some exemplary embodiments of the disclosed subject.

It should be noted that the dual-cam device that is shown in FIG. 4B may be the same as dual-cam device 100 except for incorporating regulator 150.

In some exemplary embodiments, when regulator 150 is in the second position, it pushes jaw 130 away from body 140 towered object 11, i.e. [b]>0. Consequently, distancing the cam 128 from the rear-end 132, which reduces the pressure that can be applied by cam 128, allows to achieve a pressure control mechanism. The control over the pressure using the regulator can be achieved by rotating the pressure control dial of the regulator 150 shown in FIG. 1. The dial, shown schematically also in FIGS. 4A and 4B at the free end of the regulator 150 is connected to the regulator's stem that is shown to pass through the body 140 and the jaw 130. The stem of the regulator 150 is preferably threaded so as to form a screw that pass through the jaw 130. The positioning of the screw relative to the jaw is determined by the dial that can be rotated about the thread of the stem. In this way, the distance b is regulated. Other regulation mechanisms are possible without limiting the scope of the present subject matter as disclosed. In accordance with another aspect, a clamping apparatus for clamping at least one object is provided, the clamping apparatus comprising: at least one rail having a channel; at least one stopper; and at least one dual-cam device, each dual-cam device comprising: a jaw; a body; a member connecting the jaw and the body wherein the member has a member-base configured to slide within the channel; and a lever pivotally connected to said member, wherein the lever has a first cam and a second cam and wherein the lever is configured to be tilted, wherein during tilting the lever from an open position in which the dual cam device slides along the rail to a clamp position in which the object is clamped, the first cam causes the dual cam device to secure emplacement position of the dual cam device to the rail and then the second cam causes the dual cam device to press and clamp the object by the jaw against the stopper.

Figure 5:
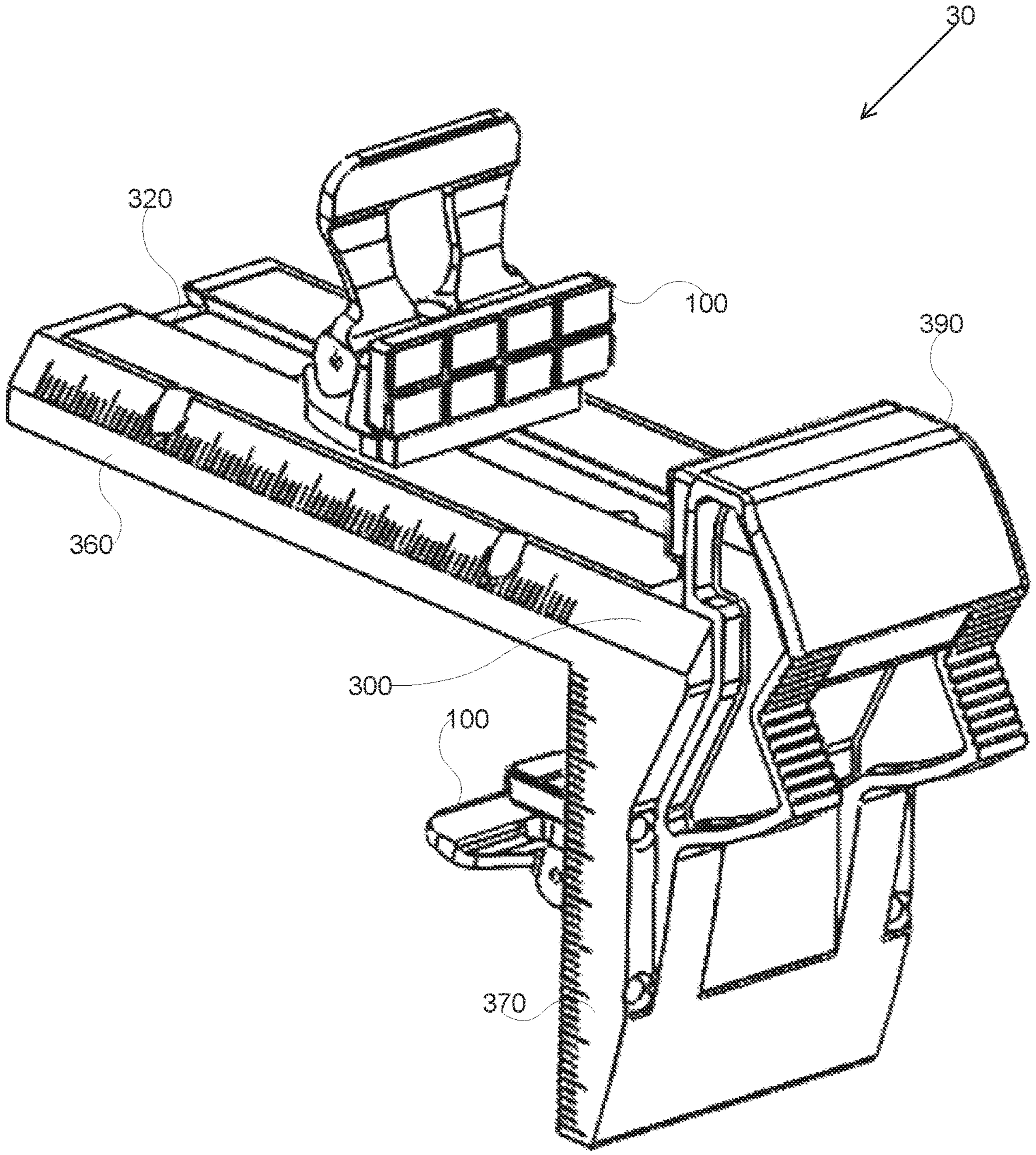
FIG. 5 shows a perspective view of another clamping apparatus, in accordance with some exemplary embodiments of the disclosed subject matter.

Referring now to FIG. 5 showing a perspective view of another clamping apparatus, in accordance with some exemplary embodiments of the disclosed subject matter.

In some exemplary embodiments, clamping apparatus 30 is comprised of at least one dual-cam device 100, an L-shape clamping base 300 and at least one stopper 390. In some exemplary embodiments, the L-shape clamping base 300 is comprised of a first marked rail 360 and a second marked rail 370 that are perpendicular to each other, wherein each rail has a channel and wherein the marking is either metric marking imperial marking or both. It should be noted that each device 100 of the clamping apparatus 30 operates with respect to the rail it corresponds to, in the same manner of the clamping apparatus 10.

Figure 6:
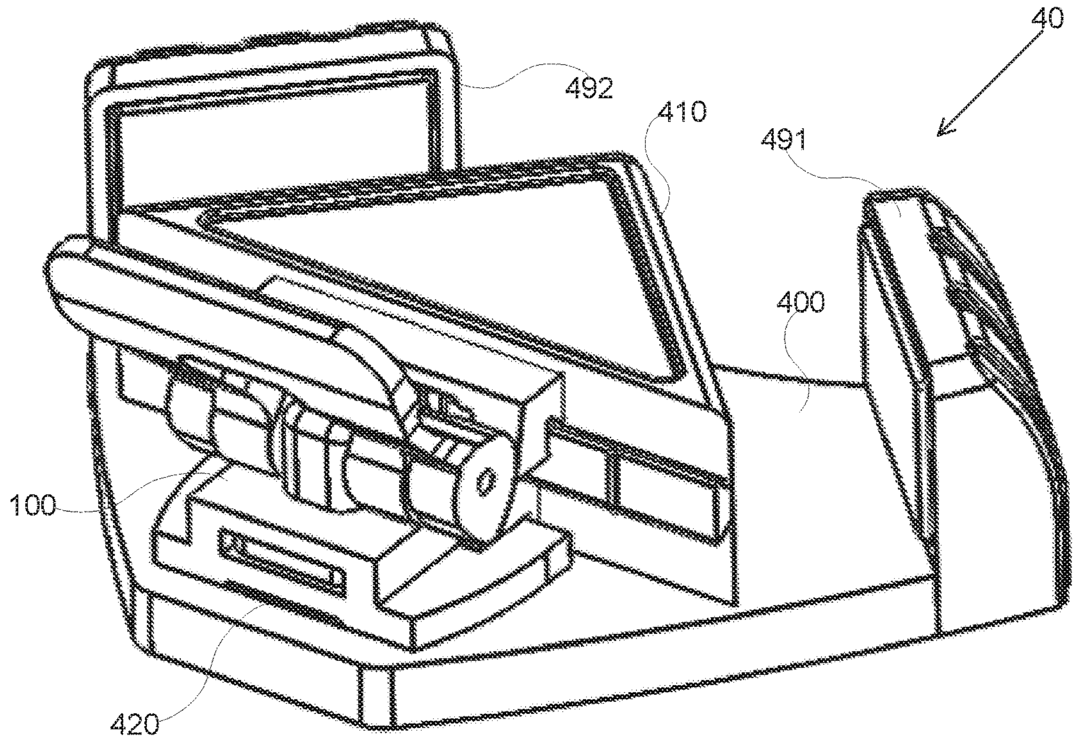
FIG. 6 shows a perspective view of yet another clamping apparatus, in accordance with some exemplary embodiments of the disclosed subject matter.

Referring now to FIG. 6 showing a perspective view of yet another clamping apparatus, in accordance with some exemplary embodiments of the disclosed subject matter.

In some exemplary embodiments, clamping apparatus 40 is comprised of device 100; a corner clamping base 400, having channel 420; a stopper 491; a stopper 492 that are perpendicular to each other; a jaw extension 410 permanently connected to jaw 130 of device 100. In some exemplary embodiments, the jaw extension 410 has a shape of right-angled triangle connected to jaw 130 by its hypotenuse side.

Figure 7:
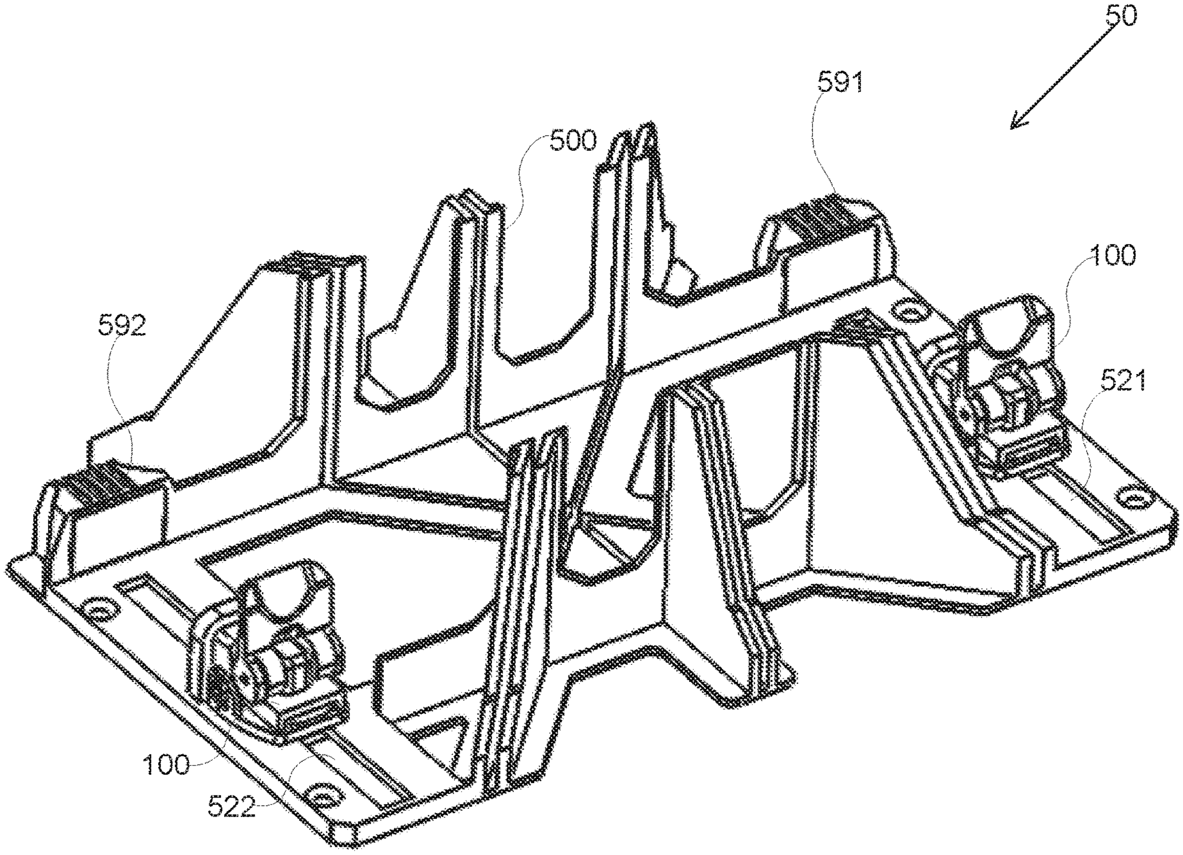
FIG. 7 shows a perspective view of yet another clamping apparatus, in accordance with some exemplary embodiments of the disclosed subject matter.

Referring now to FIG. 7 showing a perspective view of yet another clamping apparatus, in accordance with some exemplary embodiments of the disclosed subject matter. In some exemplary embodiments, clamping apparatus 50 is comprised of at least one device 100; a mitered slotted base 500 comprising at least two channels, such as channels 521 and 522 and at least two stoppers, such as stoppers 591 and 592. The mitered slotted base 500 comprising at least two channels, such as channels 521 and 522, which are configured to accommodate two or more devices.

In some exemplary embodiments, clamping apparatus 30, clamping apparatus 40 and clamping apparatus 50 may be made of similar material as clamping apparatus 10 and also manufactured similarly. It should be noted that, that clamping apparatus 30, clamping apparatus 40 and clamping apparatus 50 can also be used as vise tools.

In some exemplary embodiments, the stoppers 290, 390, 491, 492, 591 and 592 can be fixed-jaws that are an integral part of the rails or the bases; fixed-jaws that connected to one end of the rails or the bases; devices 100 and any combination thereof, or the like.

Other architectures can be built with different shaped rails and other combinations with different amounts of stoppers or dual cam devices.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A clamping apparatus for clamping at least one object, the clamping apparatus comprising:
- at least one rail having a channel;
- at least one stopper; and
- at least one dual-cam device, each dual-cam device comprising:
  - a jaw;
  - a body;
  - a member connecting the jaw and the body wherein the member has a member-base configured to slide within the channel; and
  - a lever pivotally connected to said member, wherein the lever has a first cam and a second cam and wherein the lever is configured to be tilted,
- wherein during tilting the lever from an open position in which the dual cam device slides along the rail to a clamp position in which the object is clamped, the first cam causes the dual cam device to secure emplacement position of the dual cam device to the rail and then the second cam causes the dual cam device to press and clamp the object by the jaw against the stopper.

2. The clamping apparatus of claim 1, wherein the first cam and the second cam form an eccentric bushing that rotates around a pivot when the lever is tilted, wherein said first cam causes the dual cam device to secure emplacement by applying pressure that pulls the member upwardly so that the member-base is locked against the rail, and wherein said second cam causes the dual cam device to clamp the object by applying pressure against a rear-end of the jaw thereby pushing the object against the stopper.

3. The clamping apparatus of claim 1, wherein the at least one rail comprises two perpendicular rails, the clamping apparatus further comprising an L-shape clamping base constructed of the two perpendicular rails each having metric marking and imperial marking, and wherein each rail is configured to accommodate the at least one dual cam device.

4. The clamping apparatus of claim 1, wherein the at least one stopper comprises two stoppers, wherein the clamping apparatus further comprises a corner clamping base comprising the two stoppers mounted perpendicular to one to the other and the channel is configured to accommodate the at least one dual cam device, wherein the dual cam device further comprises a jaw-extension having a right-angled triangle shape, and wherein a hypotenuse side of the jaw-extension is permanently connected to the jaw.

5. The clamping apparatus of claim 1, further comprising a mitered slotted base comprising a plurality of the stoppers and a plurality of the channels being configured to accommodate two or more of the dual cam devices.

6. The clamping apparatus of claim 3, wherein the clamping apparatus is used as vise tools.

7. The clamping apparatus of claim 1, wherein the stopper is selected from the group consisting of a fixed-jaw integrated with the rail or the member-base; a fixed-jaw connected to the rail or the member-base; another dual cam device; a vise; and any combination thereof.

8. The clamping apparatus of claim 2, wherein the dual cam device further comprises a regulator configured to adjust the pressure against the rear-end of the jaw.

9. The clamping apparatus of claim 8, wherein the regulator is a threaded screw that can be rotated using a dial.

10. The clamping apparatus of claim 1, wherein the channel is designed to accommodate and engage with the member base.

11. A dual-cam device configured to be engaged with a rail and a stopper for clamping at least one object, the device comprising:
- a jaw;
- a body;
- a member connecting the jaw and the body wherein the member has a member-base configured to associate with and slide on the rail; and
- a lever pivotally connected to said member, wherein the lever has a first cam and a second cam and wherein the lever is configured to be tilted from an open position to a clamp position and vice versa,
- wherein during tilting the lever from an open position in which the dual cam device slides along the rail to a clamp position in which the object is clamped, the first cam causes the dual cam device to secure emplacement position of the dual cam device to the rail and then the second cam causes the dual cam device to press and clamp the object by the jaw against the stopper.

12. The dual-cam device of claim 11, wherein the first cam and the second cam form an eccentric bushing that rotates around a pivot when the lever is tilted, wherein said first cam causes the dual cam device to secure emplacement by applying pressure that pulls the member upwardly so that the member-base is locked against the rail, and wherein said second cam causes the dual cam device to clamp the object by applying pressure against a rear-end of the jaw thereby pushing the object against the stopper.

13. The dual-cam device of claim 12, wherein the dual cam device further comprises a regulator configured to adjust the pressure applied against the jaw.

14. The dual-cam device of claim 13, wherein the regulator is a screw having a dial.

* * * * *